(12) United States Patent
Kroll et al.

(10) Patent No.: US 10,539,255 B2
(45) Date of Patent: Jan. 21, 2020

(54) ADDITIVE LAYER MANUFACTURING METHOD FOR PRODUCING A THREE-DIMENSIONAL OBJECT AND THREE-DIMENSIONAL OBJECT

(71) Applicant: Airbus Operations GmbH, Hamburg (DE)

(72) Inventors: Lothar Kroll, Dresden (DE); Frank Schubert, Marienberg (DE); Sebastian Blümer, Chemnitz (DE); Gerhard Hummel, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 569 days.

(21) Appl. No.: 14/199,553

(22) Filed: Mar. 6, 2014

(65) Prior Publication Data

US 2014/0305529 A1 Oct. 16, 2014

Related U.S. Application Data

(60) Provisional application No. 61/774,127, filed on Mar. 7, 2013.

(30) Foreign Application Priority Data

Mar. 7, 2013 (DE) .................. 10 2013 203 936

(51) Int. Cl.
*B29C 67/00* (2017.01)
*F16L 9/19* (2006.01)
(Continued)

(52) U.S. Cl.
CPC ............. *F16L 9/19* (2013.01); *B29L 2009/00* (2013.01); *B29L 2022/00* (2013.01)

(58) Field of Classification Search
CPC ............ B29C 67/0051; B29C 67/0074; B29C 67/0077; B29C 70/30; B29C 64/153;
(Continued)

(56) References Cited

U.S. PATENT DOCUMENTS 6,193,923 B1 * 2/2001 Leyden .................. B29C 41/12
264/308
7,222,668 B2 * 5/2007 Belshaw ............... E21B 49/084
166/162
(Continued)

FOREIGN PATENT DOCUMENTS

CN 1446652 10/2003
CN 1753747 3/2006
(Continued)

OTHER PUBLICATIONS

Chinese Office Action for Application No. 201410080976.4 dated Sep. 22, 2015.
(Continued)

*Primary Examiner* — Eric S Stapleton
(74) *Attorney, Agent, or Firm* — Jenkins, Wilson, Taylor & Hunt, P.A.

(57) ABSTRACT

An additive layer manufacturing method is disclosed for producing a three-dimensional object and a corresponding object. Layers of powder material are applied to a carrier and each layer is irradiated with a laser beam or a particle beam only in areas of the layer corresponding to the three-dimensional object to be produced. Irradiation occurs so the powder material in the corresponding areas is locally melted or sintered. An elongate portion of the object is constructed so longitudinal channels extend at an angle of more than 45° to the direction of the force of gravity, and along its entire length the longitudinal channels are formed so that in cross section perpendicular to the direction of extension of the elongate portion the minimum distance to the outer surface (Continued)

of the elongate portion is not smaller than the minimum distance to the closest neighbouring longitudinal channel or the closest neighbouring longitudinal channels.

15 Claims, 2 Drawing Sheets

(51) Int. Cl.
    *B29L 9/00*     (2006.01)
    *B29L 22/00*     (2006.01)

(58) Field of Classification Search
    CPC ... B33Y 8/00; B33Y 10/00; F16L 9/19; B22F 5/10; B22F 3/1055; B29L 2009/00; B29L 2022/00; B29L 2023/00; Y02P 10/295
    USPC ...... 219/216, 121.85; 264/497, 401; 419/53; 700/119; 138/111
    See application file for complete search history.

(56) References Cited

U.S. PATENT DOCUMENTS

| | | | | |
|---|---|---|---|---|
| 2002/0152715 | A1* | 10/2002 | Rotheroe | E04C 3/32 52/855 |
| 2006/0003095 | A1* | 1/2006 | Bullen | B22F 3/004 427/180 |
| 2006/0208396 | A1 | 9/2006 | Abe et al. | |
| 2009/0255602 | A1* | 10/2009 | McMasters | B23P 6/007 138/115 |
| 2012/0113439 | A1 | 5/2012 | Ederer | |
| 2012/0217226 | A1 | 8/2012 | Bayer et al. | |
| 2014/0048980 | A1* | 2/2014 | Crump | B29C 67/0085 264/401 |
| 2014/0084583 | A1* | 3/2014 | Hemingway | B29C 67/0055 285/374 |

FOREIGN PATENT DOCUMENTS

| | | | | |
|---|---|---|---|---|
| CN | | 101653827 | 2/2010 | |
| DE | 10 2006 062 373 | | 6/2008 | |
| DE | | 102008031926 A1 * | 1/2010 | ............ B22F 3/1055 |
| EP | | 1348506 | 10/2003 | |
| EP | | 2 647 942 | 10/2013 | |
| WO | WO 01/02160 | | 1/2001 | |
| WO | WO 2012/166546 | | 6/2012 | |

OTHER PUBLICATIONS

German Search Report for Application No. 10 2013 203 936.0 dated Nov. 4, 2013.

* cited by examiner

ADDITIVE LAYER MANUFACTURING METHOD FOR PRODUCING A THREE-DIMENSIONAL OBJECT AND THREE-DIMENSIONAL OBJECT

CROSS-REFERENCE TO RELATED APPLICATIONS

This application claims priority to and the benefit of U.S. Provisional Patent Application Ser. No. 61/774,127 and to German Patent Application Serial Number DE 10 2013 203 936.0, both of which were filed Mar. 7, 2013, the entire disclosures of which are incorporated by reference herein.

TECHNICAL FIELD

The present invention relates to a generative or additive layer manufacturing method for producing a three-dimensional object having an elongate portion or section, which is adapted for conveying fluid between its two longitudinal ends, and to a three-dimensional object which can be produced using such a method.

BACKGROUND

Generative or additive layer manufacturing methods are increasingly being used to produce prototypes or completed components very quickly. In contrast to conventional production processes, which comprise removing material from a block of material by, for example, milling, cutting, drilling or other machining processes, additive layer manufacturing processes construct a desired three-dimensional object directly layer by layer based on a digital description or representation of the object. They are also known as 3D printing or rapid prototyping.

In a typical additive layer manufacturing method a thin layer of material, from which the object is to be produced, is first applied to a carrier plate in powder form and the powder of the layer which has just been applied is melted or sintered using laser radiation selectively only in those areas of the layer which correspond to the object to be manufactured. A further thin layer of the material in powder form is then applied to the thus-processed first layer and in turn melted or sintered using laser radiation selectively only in those areas of the layer which correspond to the object to be produced. This step is repeated until the complete object has been manufactured. In each layer, the powder which does not correspond to the object is not irradiated and remains in powder form, with the result that it can be removed from the completed object at a later time. The carrier plate can be provided by a movable table which, after each irradiation of a layer, is moved downwardly by a distance which is identical to the thickness of this layer in order to ensure that the starting conditions are identical before each layer is applied.

It is to be pointed out in this connection that it is in principle also possible for the individual layers not to be continuous or to completely cover the carrier plate but to have material only in those areas which correspond to the object to be produced or in areas which comprise those areas which correspond to the object to be produced.

Specific additive layer manufacturing methods are the so-called selective laser melting (SLM) and the so-called selective laser sintering (SLS), in which, as indicated above, a laser beam is used to irradiate the layers. However, it is also possible to use a particle beam and in particular an electron beam for this purpose. Specific additive layer manufacturing methods which use an electron beam are, corresponding to the two processes mentioned previously, the so-called selective electron beam melting and the so-called selective electron beam sintering.

As explained above, the object is constructed directly layer by layer in a three-dimensional manner. This makes it possible to produce different highly complex objects efficiently and quickly in the same device from different materials, in particular from metal but also from plastics and ceramic materials. For example, highly complex grid or honeycomb structures, which cannot be generated, or can only be generated with difficulty, using other methods, can be easily produced. In comparison with traditional production processes, the complexity of the object has only a limited influence on the production costs.

In additive layer manufacturing methods such as those mentioned above it must be noted, however, that, in areas of the object which form an overhang or a projecting or cantilevered portion during the layer-by-layer construction (i.e. in the orientation of the object during its production) viewed opposite to the direction of the force of gravity, particular measures may have to be taken to enable the manufacturing of the object or to increase its geometrical precision. In such areas, which are designated as overhang in the framework of this application, a melted or sintered part of each layer extends, with an edge section or portion thereof, beyond the melted or sintered part of the previous layer such that these edge sections of the individual layers are not supported by a melted or sintered part of the respective previous layer. This leads to the areas sinking into the powder bed under their own weight if the individual edge sections in each case project too far beyond the respective previous layer.

A possible measure is to select the extension of the edge sections such that the step structure provided by the individual layers on the surfaces of the areas stabilizes these sufficiently to prevent the sinking in. The exact demands on this step structure depend, among other things, on the structure and the dimensions of the object and on what forces act on the overhanging areas as a result of this. However, it has been found that problems can be reliably avoided if the surfaces of the overhanging areas do not exceed an angle of 50° with respect to the direction of the force of gravity during the layered construction. It is to be noted that, in the framework of this application, as is customary the outline, extension or course of a surface disregards the step structure which is always present, i.e. represents an averaging over the step structure.

However, this condition cannot always be met and support structures must then be provided for the overhanging areas, which structures are mechanically or chemically removed once the object is completed, or remain in the object. In either case, support structures mean additional material expenditure and thereby increase the weight and the cost of the object.

An example in which the above condition cannot be met is a tubular element with, for example, a circular inner and outer cross section, the longitudinal axis or direction of extension of which extends at an angle of more than 45° or 50° and for example perpendicular to the direction of the force of gravity during the layered construction. Then the circularly closed inner surface of the tubular element namely necessarily has sections which border or define an overhanging area or overhang in the above sense and extend at least in parts at an angle of more than 50° with respect to the direction of the force of gravity. If the tubular element exceeds a certain internal diameter, the support within the tube wall itself is no longer sufficient, for the reasons given above, to be able to produce the element without the provision of additional temporary support elements inside the tubular element.

SUMMARY

It is an object of the invention to achieve a cost and time saving in the case of the production of a three-dimensional object having an elongate portion which is adapted for conveying fluid between its two longitudinal ends, using an additive layer manufacturing method.

This object is achieved by a method as described herein and a three-dimensional object as described herein. Advantageous embodiments of the method and of the object are also described herein.

BRIEF DESCRIPTION OF THE DRAWINGS

An exemplary preferred embodiment of the invention is explained in more detail below with reference to the drawings, in which.

DETAILED DESCRIPTION

Figure 1A:
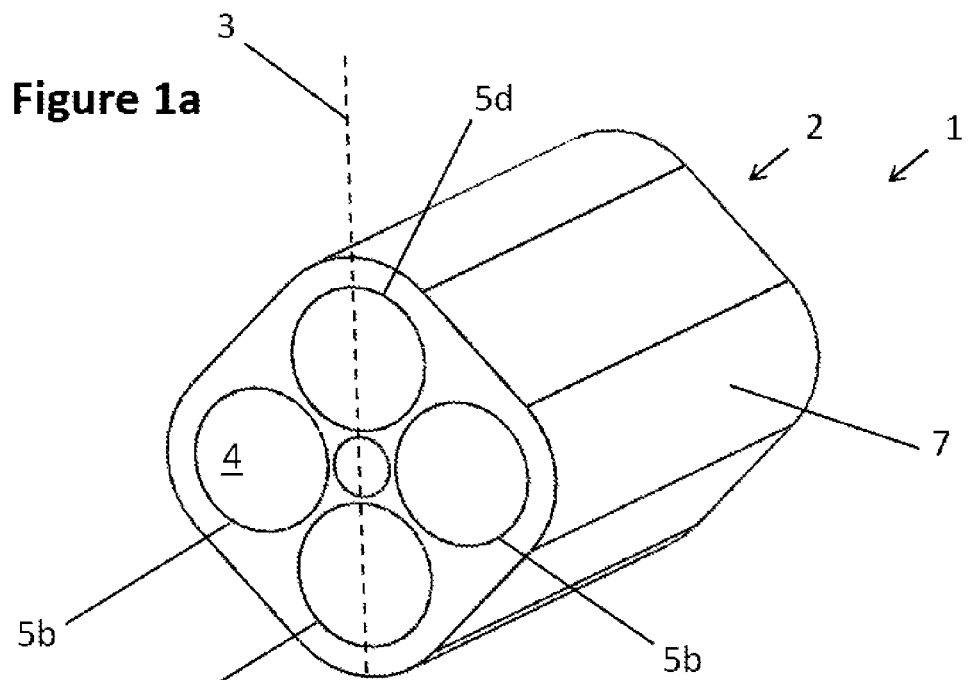
FIG. 1a shows a perspective view of a partial section of a three-dimensional object which has been produced according to an embodiment of the invention using an additive layer manufacturing method and has an elongate portion having multiple cylindrical cavities with a circular cross section, which extend in each case from one end of the second portion to the other end.

According to the present invention a generative or additive layer manufacturing method for producing a three-dimensional object is provided, in which method, in the manner already explained, a plurality of layers of a powder material are applied one after the other and one on top of the other to (i.e. arranged or deposited one after the other and one on top of the other on) a carrier, in particular a flat platform or a flat table, and each layer is irradiated, before the following layer is applied, with a laser beam or a particle beam selectively only in the areas of the layer which correspond to the three-dimensional object to be produced. The irradiation takes place in such a way that the powder material in the corresponding areas is locally melted or sintered. The three-dimensional object can be for example a hydraulic distribution system or a part of a hydraulic distribution system.

The object produced by the method, i.e. the result of the method or process, has an elongate section or portion, which in the longitudinal direction or the direction of extension has a first end and an opposite (along the direction of extension) second end and multiple longitudinal channels, which extend—separated from one another by material areas or portions of the elongate portion—in each case in the longitudinal direction or the direction of extension of the elongate portion from the first to the second end, with the result that a fluid can be conveyed through each of the longitudinal channels from the first end to the second end. The object can therefore be for example a hydraulic distribution system or a part of a hydraulic distribution system. Furthermore, the elongate portion has an outer surface or an outer circumferential surface, which—except in places in which any possible connection or support structures engage the elongate portion from the exterior thereof—extends at least about the direction of extension of the elongate portion and accordingly represents its outside. The elongate portion can be straight or can have a course, i.e. extension or path, in which the direction of extension is curved arbitrarily in a plane or in space. The same applies to the longitudinal channels individually and in their entirety. In this connection it is also conceivable that the longitudinal channels change their orientation relative to one another along their length.

The longitudinal channels can also be referred to as longitudinal passages or longitudinal bores, wherein in the usual manner the term "bore" then does not imply that a process step of "boring" is carried out. Rather the three-dimensional object including the longitudinal channels, or longitudinal passages or longitudinal bores, is always constructed, i.e. manufactured, directly.

In the method the elongate portion is constructed, i.e. manufactured, such that during the layer-by-layer construction (i.e. the layer-by-layer manufacture) the longitudinal channels extend, along their entire length or at least along a part of their length, at an angle of more than 45°, more preferably at an angle of more than 50° and in particular perpendicular to the direction of the force of gravity.

Furthermore, in the method the elongate portion is produced such that the longitudinal channels are constructed and arranged in such a way that, along the entire length of the elongate portion in cross section perpendicular to its direction of extension, for each of the longitudinal channels the minimum distance to the outer surface of the elongate portion is not smaller than and is preferably greater than the minimum distance to the closest or nearest neighbouring longitudinal channel or—in the case of several closest or nearest neighbouring longitudinal channels—to the closest or nearest neighbouring longitudinal channels. In other words, it is true for each longitudinal channel which is not surrounded in all directions by other longitudinal channels that everywhere along its length in cross section the shortest possible straight line which can be drawn from the edge of the longitudinal channel to the outer surface of the elongate element and passes exclusively through material of the elongate portion and does not cross any longitudinal channel, is at least the same length as and preferably longer than the corresponding shortest possible lines which can be drawn from the edge of the longitudinal channel to the edge of the nearest neighbouring longitudinal channels. If the material areas of the elongate portion which are arranged in cross section around a longitudinal channel are regarded as a wall belonging to the respective longitudinal channel, the above condition means nothing other than that the wall sections or portions, which border longitudinal channels to the outside of the elongate portion, are at least as thick as and preferably thicker than wall sections or portions between neighbouring or adjacent longitudinal channels.

This procedure has the advantage that, in comparison with using a single longitudinal channel with a diameter greater than the diameter of the individual longitudinal channels of the elongate portion and in particular with a cross-sectional surface or a tubular cross section which corresponds to the combined cross-sectional surface or the combined tubular cross section of the individual longitudinal channels of the elongate portion, if the same material and the same process parameters including the orientation in relation to the direction of the force of gravity are used, the number of support structures inside the longitudinal channels can be significantly reduced. Depending on the material and process parameters and the diameter of the longitudinal channels, such support structures can optionally even be dispensed with entirely. The amount of material used for support structures and the effort for removing them subsequently can thereby be reduced. This advantage is not negated by the walls between the longitudinal channels because the wall thickness between adjacent longitudinal channels can be significantly reduced and selected to be sufficiently low, when the elongate portion—comparable to a portion with only one longitudinal channel—is provided to convey fluid from the same source to the same target through all longitudinal channels. In this case there is namely no or only a small difference in hydraulic pressure between adjacent longitudinal channels.

In a preferred embodiment the second section or portion is constructed such that the cross-sectional shapes and dimensions of the longitudinal channels in each case are constant along their entire length and the diameter and the shape of the individual longitudinal channels is selected such that they can in each case be constructed without support, while an individual longitudinal channel with the same shape and a tubular cross section which is identical to the combined tubular cross section of the longitudinal channels could not be constructed without support, using the same powder material, the same process parameters and the same orientation. In this case, the advantage mentioned above is particularly pronounced since support elements can be completely dispensed with without impairing the tubular cross section.

In a preferred embodiment the longitudinal channels are formed along the entire length of the elongate portion in such a way that in cross section perpendicular to the direction of extension of the elongate portion the maximum diameter of each of the longitudinal channels does not exceed 15 mm, preferably 10 mm and more preferably 7 mm. It has been found that these diameters can be constructed without support, wherein with a maximum diameter of 10 mm and in particular of 7 mm, depending on the material used and the process parameters used, it is potentially possible to construct cleaner inner surfaces without defects than with a maximum diameter of 15 mm. In this embodiment too, which can be combined with the previous embodiment, the above-named advantage is thus particularly pronounced.

In a preferred embodiment each of the longitudinal channels has a circular shape in cross section along its entire length. However, any other cross-sectional shapes are also possible, such as in particular oval, triangular, rectangular or polygonal shapes. Furthermore, it is also possible for individual or all longitudinal channels to change their cross-sectional shape along their length. The same also applies to their cross-sectional dimensions.

In a preferred embodiment the elongate portion is manufactured such that along the entire length of the elongate portion the longitudinal channels are arranged in cross section perpendicular to the direction of extension of the elongate portion such that, taking into account the cross-sectional shapes and dimensions of the longitudinal channels and of the elongate portion, the material of the elongate portion between the longitudinal channels is minimized while adhering to a minimum value of 0.5 mm. In the case of longitudinal channels having a circular cross section, an arrangement is thus particularly preferred which corresponds to a sphere packing. In this way the material required to separate the different longitudinal channels is minimized in an advantageous manner.

In a preferred embodiment, in addition to the elongate portion or section, the object also has a second portion or section and a support structure between the elongate portion and the second portion, which connects the elongate portion and the second portion to one another. In the course of the layer-by-layer construction of the object the second portion is constructed before the elongate portion. Alternatively it is also possible for the second portion to be provided as a separate component on which the support structure and the elongate portion are constructed. In addition, during the layer-by-layer construction of the object the longitudinal channels are arranged along the entire length of the elongate element in cross section perpendicular to the direction of extension of the elongate element such that, for all longitudinal channels except one, at least one other longitudinal channel exists, which is arranged nearer to the second portion and for which the angle between the direction of the force of gravity and the connecting line between the central points of the two respective longitudinal channels does not exceed 50° and preferably does not exceed 45°. In other words, there is exactly one longitudinal channel which is arranged closest to the second portion along the entire length of the elongate portion, and all other longitudinal channels are supported either by this longitudinal channel or by at least one other longitudinal channel which is offset by not more than 50° or preferably 45° and lying further "downwardly" in the direction of the force of gravity, and by the corresponding wall sections. This procedure has the advantage that the demands on the support structure between the elongate portion and the second portion and in particular the demands on the corresponding support of the outer surface of the elongate portion can be reduced in an advantageous manner.

In this embodiment it is accordingly furthermore preferred if, during the layer-by-layer construction of the object, along the entire length of the elongate element in cross section perpendicular to the direction of extension of the elongate element the support structure is only connected to the elongate element in an area of the latter, which area defines the longitudinal channel which lies nearest to the second portion or represents a part of the outer wall of this longitudinal channel, and if all sections of the outer surface of the elongate element, which sections, viewed opposite to the direction of the force of gravity—and thus also in relation to the direction of the force of gravity—define an overhang, do not exceed an inclination angle of 50° in relation to the direction of the force of gravity. This condition can be met particularly easily because of the relative arrangement of the longitudinal channels to one another which characterizes this embodiment. For example, due to the fact that only one longitudinal channel is arranged closest to the second portion and all other longitudinal channels are arranged further above in relation to the direction of the force of gravity and do not exceed an angular offset of 50° and preferably 45°, it is possible to keep the area of the outer surface of the elongate portion, which is facing the second portion and in which an inclination angle of 50° would be exceeded without the support structure, very small. In particular, the radius of curvature of the outer surface in this area can be selected corresponding to the radius of curvature of the lowest longitudinal channel, so that the outer surface passes into a non-critical inclination angle area as quickly as possible as the distance from the second portion increases. In other words, despite a relatively large total pipe cross section, the outer surface of the elongate element in the area of the lowest longitudinal channel can extend outwardly "more perpendicularly", and the other longitudinal channels can be arranged such that the inclination angle condition can also be met easily in all other areas of the outer surface.

In a preferred embodiment the second portion is a functional portion or section, which fulfils a function going beyond a support function in the completed three-dimensional object. In general—in particular in cases in which the completed three-dimensional object is a hydraulic distribution system, part of a hydraulic distribution system or another system which is provided for conveying fluid or comprises conveying fluid—functional portions or sections can be for example elements adapted and provided for conveying a fluid, such as for instance pipe-shaped, tubular or channel-shaped portions or sections having a circular or any other cross section, holding or securing elements for holding or securing the completed three-dimensional object to another object, or cable channels.

In a preferred embodiment the second portion is a flat plate. In the framework of this embodiment it is particularly preferred if the plate is oriented perpendicular to the direction of the force of gravity during the layer-by-layer construction of the object. Such a plate is a functional portion or section in the above sense because it serves for securing to a surface or for securing further components of the three-dimensional object. The second portion can, however, also have other shapes and can be for instance an elongate element, such as for example a tube or pipe or a tube or pipe section with a circular, oval, rectangular, square or any other cross-sectional shape or another element suitable for conveying a fluid through it.

In a preferred embodiment the longitudinal axes or directions of extension of the elongate portion and of the individual longitudinal channels during the layer-by-layer construction of the object extend at an angle of more than 45°, more preferably at an angle of more than 50° and most preferably perpendicular to the direction of the force of gravity.

If the two embodiments mentioned previously are combined, it is preferred if the longitudinal axes or directions of extension of the elongate portion and of the individual longitudinal channels extend in a plane parallel to the plane defined by the plate. The same applies in cases in which the second portion is an elongate element.

It is preferred if the additive layer manufacturing method is selective laser melting (SLM), selective laser sintering (SLS), selective electron beam melting or selective electron beam sintering.

The invention also relates to a three-dimensional object which has been or can be produced using one of the methods mentioned previously and which has a structure which is evident from the previous explanations. In particular the invention thus relates generally to a three-dimensional object which can be and preferably has been produced using one of the method embodiments mentioned previously and has an elongate portion or section, which has an outer surface and, in the direction of extension, has a first end and an opposite second end and several longitudinal channels, which extend, separately from one another, in each case in the direction of extension of the elongate portion from the first to the second end, so that a fluid can be conveyed through each of the longitudinal channels from the first end to the second end. The longitudinal channels are formed and arranged along the entire length of the elongate portion in such a way that, in cross section perpendicular to the direction of extension of the elongate portion, for each of the longitudinal channels the minimum distance to the outer surface of the elongate portion is not smaller than the minimum distance to the closest neighbouring longitudinal channel or the closest neighbouring longitudinal channels.

In a preferred embodiment the elongate portion and/or one, several or all of the longitudinal channels have a spatial course, i.e. path or extension, in which the respective direction of extension is curved in a plane or spatially, preferably in such a way that in every orientation of the three-dimensional object the longitudinal channels extend, at least along part of their length, at an angle of more than 45° and preferably more than 50° to the direction of the force of gravity.

The three-dimensional object is preferably a hydraulic distribution system or a part of a hydraulic distribution system.

Figure 1B:
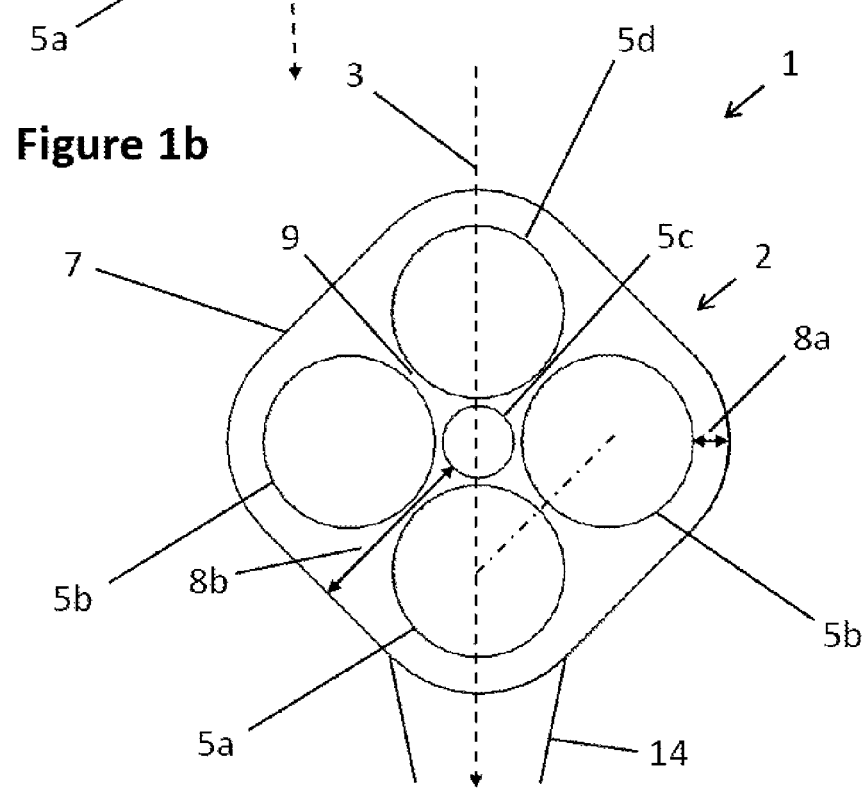
FIG. 1b shows a cross-sectional view of a further partial section of the object in FIG. 1a perpendicular to the longitudinal axis of the elongate portion.

The three-dimensional object 1 shown in FIGS. 1a and 1b has a straight elongate portion or section 2 or a straight elongate element or component 2, which has five longitudinal channels 5a to 5d with a circular cross section which extend along the entire length of the elongate portion 2 between its opposite ends and of which the four outer ones 5a, 5b, 5d have an identical diameter and the central one 5c has a smaller diameter. Through these longitudinal channels 5a to 5d, as in a tubular element with a single longitudinal channel, fluid can be conveyed from one end of the elongate portion to the other.

In the cross-sectional view of FIG. 1b, the elongate portion 2 is shown in the orientation in which it is or was also situated during the layer-by-layer construction, i.e. while the additive layer manufacturing process is being carried out, wherein the dashed arrow 3 indicates the direction of the force of gravity. Furthermore, the direction of construction defined by the layer-by-layer construction is selected antiparallel to the direction of the force of gravity.

The elongate portion 2 furthermore has a circumferential outer surface or circumferential surface 7, which borders the elongate portion 2 externally perpendicular to its direction of extension.

As is evident in particular from FIG. 1 b, each of the longitudinal channels 5a to 5d is separated in each case from the outer surface 7 of the elongate portion 2 along several radial directions by a continuous area or region of material of the elongate portion 2. For one of the larger, outer longitudinal channels 5b the thinnest such material area is designated by the double arrow 8a, and for the smaller, central longitudinal channel 5c by the double arrow 8b. The longitudinal channels 5a to 5d are arranged such that these areas 8a, 8b are thicker for each longitudinal channel 5a to 5d than the minimum wall thickness between neighbouring longitudinal channels 5a to 5d. For two adjacent longitudinal channels 5b, 5d this region of minimum wall thickness is designated in FIG. 1b by the reference numeral 9.

The inner surfaces 4 of the longitudinal channels 5a to 5d having a circular cross section border or define, in each case in a partial area which is located in the upper half of the cross section in relation to the direction of the force of gravity, an overhang in the above sense, in which the respective inner surface extends at an angle of more than 50° to the direction of the force of gravity. In the framework of this application angles of a surface in relation to the direction of the force of gravity are always measured such that the angle is at most 90°, i.e. the smaller of the two possible angles is always used.

A tubular element orientated in exactly the same way, having a single longitudinal channel with an internal diameter of e.g. more than 15 mm, is now envisaged and it is assumed that, taking into account the material used and the process parameters used, such as for example the thickness of the powder layers, it would be impossible to construct the tubular element per se because of the breach of the above angle condition. Support structures would then have to be provided inside such a tubular element along its entire length, which support structures provide the additional support required for the overhang with a critical inclination angle. To avoid too large a reduction in the tubular cross section, these support structures would have to be removed mechanically or chemically after the production of the tubular element, which leads to additional costs and additional expenditure of time.

Against this background, the diameter of the longitudinal channels 5a to 5d is in each case not greater than 7 mm, and in this way the elongate portion 2 can be constructed without support structures inside the longitudinal channels 5a to 5d in contrast to a tubular element having a single longitudinal channel with a larger diameter of e.g. 15 mm, and the same tubular cross section can nevertheless be achieved. Because of the greatly reduced thickness of the walls between neighbouring longitudinal channels 5a to 5d, the additional material expenditure required for the formation of separate longitudinal channels can be kept low. This is the case in particular if the longitudinal channels 5a to 5d are arranged in cross section in a sphere packing, as is shown in FIG. 1 b.

Furthermore, the longitudinal channels 5a to 5d are arranged such that exactly one of the longitudinal channels 5a to 5d is arranged lowest in relation to the direction of the force of gravity 3 during the layer-by-layer construction. In the example shown this is the longitudinal channel 5a, i.e. all other longitudinal channels 5b to 5d are located further above, i.e. their central points or longitudinal axes are arranged above the central point or the longitudinal axis of the longitudinal channel 5a.

The longitudinal channels 5b, 5c are located at the same height and are arranged in each case directly above the lowest longitudinal channel 5a such that the connecting line between their central point or their longitudinal axis and the central point or longitudinal axis of the lowest longitudinal channel 5a is arranged at an angle of not more than 45° to the direction of the force of gravity. In FIG. 1b this connecting line is drawn in for the longitudinal channel 5b as a dot-dash line. The same applies to the top longitudinal channel 5d in relation to each of the "central" longitudinal channels 5b, 5c. Overall this means that all longitudinal channels 5b to 5d with the exception of the lowest longitudinal channel 5a are supported by at least one longitudinal channel lying beneath it and having an angular offset of not more than 45° and by the material areas of the elongate portion 2 surrounding it. As a result of this, the inclination of overhang-forming areas of the outer surface 7 of the elongate portion 2 can also be kept at less than 50° in relation to the direction of the force of gravity in wide areas, with the result that a support 14 of the elongate element 2, which support 14 is part of the object 1 and is shown only in FIG. 1 b, is only necessary in a relatively narrow section of the outer surface in the area of the lowest longitudinal channel 5a. On the other side of the support 14 e.g. a plate (not shown) can be located which preferably extends perpendicularly to the direction 3 of the force of gravity, or also another element, such as for instance another elongate portion or a tube portion or section. It is immediately evident in this connection that the section of the outer surface which is to be supported, i.e. the extension of the overhang formed by the outer surface 7 having an inclination of more than 50° in relation to the direction 3 of the force of gravity in FIG. 1b is much smaller than in a tubular section having a single longitudinal channel with a larger diameter, since the lowest longitudinal channel 5a in FIG. 2b can have a much smaller diameter than the longitudinal channel 5 in FIG. 1.

Figure 2:
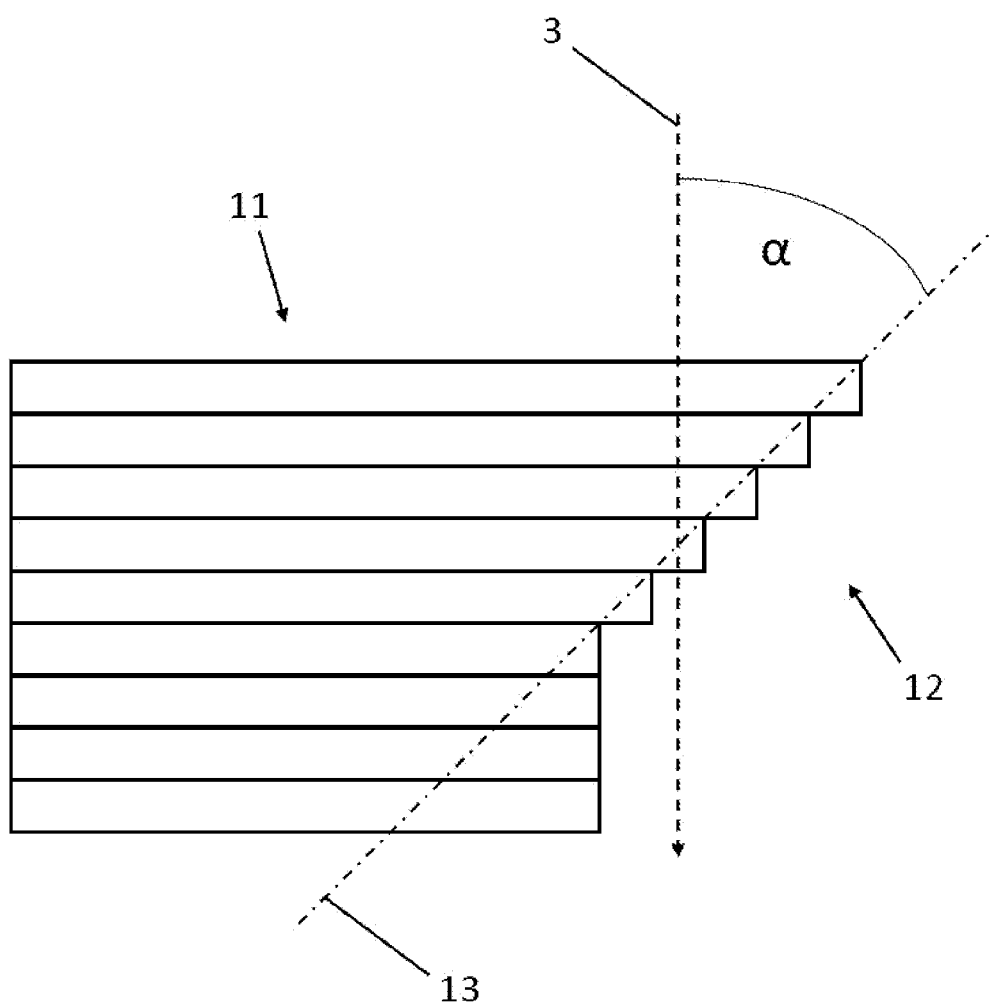
FIG. 2 shows a schematic representation of an overhang.

FIG. 2 shows, by means of a simplified example of an object constructed in layers, that the course of the outer surface in this connection is averaged over the step structure related to the layer-by-layer construction. FIG. 2 shows a small partial section 11 of a three-dimensional object which has an overhang 12. The course of the surface bordering the overhang 12 is indicated by the dot-dash line 13, which, for each layer of the overhang 12, extends respectively through the point at which the layer projects beyond the previous layer.

The invention claimed is:

1. An additive layer manufacturing method for producing a three-dimensional object, comprising:
applying layers of a powder material one on top of another to a carrier in a direction of gravity such that each layer of powder material constitutes an entire length of the elongate portion;
irradiating each layer of powder material before a following layer is applied with a laser beam or a particle beam selectively only in areas of the layer which correspond to the three-dimensional object to be produced, wherein irradiation takes place such that the powder material in the corresponding areas is locally melted or sintered;
forming an elongate portion of the three-dimensional object, which has an outer surface and in a direction of extension has a first end and an opposite second end and several longitudinal channels, which extend, separately from one another, in each case in the direction of extension of the elongate portion from the first to the second end, so that a fluid can be conveyed through each of the longitudinal channels from the first end to the second end; and
constructing the elongate portion such that:
the longitudinal channels extend, at least along a part of their length, at an angle of more than 50° to the direction of gravity; and
along the entire length of the elongate portion the longitudinal channels are formed and arranged such that, in cross section perpendicular to the direction of extension of the elongate portion, for each of the longitudinal channels, a minimum distance to the outer surface of the elongate portion is not smaller than a minimum distance to all adjacent longitudinal channels.

2. The method according to claim 1, wherein cross-sectional shapes and dimensions of each longitudinal channel are constant along the entire length and a diameter and a shape of each longitudinal channel is selected such that it can be constructed without support, while a single longitudinal channel with the same shape and a tubular cross section which is identical to a combined tubular cross section of the longitudinal channels cannot be constructed without support, using the same powder material, the same process parameters and the same orientation.

3. The method according to claim 1, wherein along the entire length of the elongate portion the longitudinal channels are formed such that, in cross section perpendicular to the direction of extension of the elongate portion, the maximum diameter of each of the longitudinal channels does not exceed 15 mm.

4. The method according to claim 1, wherein each longitudinal channel has a circular shape in cross section along the entire length.

5. The method according to claim 1, wherein the elongate portion is constructed such that, along the entire length of the elongate portion the longitudinal channels are arranged in cross section perpendicular to the direction of extension of the elongate portion, such that, taking into account cross-sectional shapes and dimensions of the longitudinal channels, the material of the elongate portion between the longitudinal channels is minimized while adhering to a minimum wall thickness of 0.5 mm.

6. The method according to claim 1, wherein the object has a second portion and a support structure between the elongate portion and the second portion, which support structure connects the elongate portion and the second portion to one another, wherein, in the course of layer-by-layer construction of the object, the second portion is constructed before the elongate portion, or the second portion is provided as a separate component on which the support structure and the elongate portion are constructed, and during the layer-by-layer construction of the object, the longitudinal channels are arranged along the entire length of the elongate element in cross section perpendicular to the direction of extension of the elongate element, such that, for all longitudinal channels except one, at least one other longitudinal channel exists, which is arranged nearer to the second portion, and for which the angle between the direction of gravity and a connecting line between central points of the two respective longitudinal channels does not exceed 50°.

7. The method according to claim 6, wherein, during the layer-by-layer construction of the object along the entire length of the elongate element in cross section perpendicular to the direction of extension of the elongate element, exactly one of the longitudinal channels is disposed nearest to the second portion, and the support structure is only connected to this in an area of the elongate element, which defines this longitudinal channel or represents part of the outer wall of this longitudinal channel, and all sections of the outer surface of the elongate element, which sections, viewed contrary to the direction of gravity, define an overhang, do not exceed an inclination angle of 50° in relation to the direction of gravity.

8. The method according to claim 6, wherein the second portion is a functional portion, which fulfils a function going beyond a support function in the completed three-dimensional object.

9. The method according to claim 6, wherein the second portion is a flat plate.

10. The method according to claim 9, wherein the plate is oriented perpendicular to the direction of gravity during the layer-by-layer construction of the object.

11. The method according to claim 1, wherein the direction of extension of the elongate portion and of each longitudinal channel during the layer-by-layer construction of the object extends at an angle of more than 50°.

12. The method according to claim 9, wherein the direction of extension of the elongate portion and of each longitudinal channel during the layer-by-layer construction of the object extends at an angle of more than 50° and and wherein the direction of extension of the elongate portion and of each longitudinal channel extends in a plane parallel to the plane defined by the plate.

13. The method according to claim 10, wherein the direction of extension of the elongate portion and of each longitudinal channels during the layer-by-layer construction of the object extends at an angle of more than 50° and wherein the direction of extension of the elongate portion and of each longitudinal channels extends in a plane parallel to the plane defined by the plate.

14. The method according to claim 1, wherein selective laser melting (SLM), selective laser sintering (SLS), selective electron beam melting or selective electron beam sintering is used as the additive layer manufacturing method.

15. An additive layer manufacturing method for producing a three-dimensional object, in which a plurality of layers of a powder material are applied one after the other and vertically one on top of the other to a carrier, and each layer is irradiated, before a following layer is applied, with a laser beam or a particle beam selectively only in areas of the layer which correspond to the three-dimensional object to be produced,
   wherein irradiation takes place such that the powder material in the corresponding areas is locally melted or sintered,
   wherein the object comprises an elongate portion, which has an outer surface and in a direction of extension has a first end and an opposite second end and several longitudinal channels, which extend, separately from one another, in each case in a direction of extension of the elongate portion from the first to the second end, so that a fluid can be conveyed through each of the longitudinal channels from the first end to the second end,
   wherein in the method the elongate portion is constructed such that:
   during layer-by-layer construction of the object the longitudinal channels extend, at least along a part of their length, at an angle of more than 50° to a direction of gravity, and
   along the entire length of the elongate portion the longitudinal channels are formed and arranged such that, in cross section perpendicular to the direction of extension of the elongate portion, for each of the longitudinal channels a minimum distance to the outer surface of the elongate portion is greater than each minimum distance between each pair of adjacent longitudinal channels.

* * * * *